C. A. WIBERG.
RUNNER ATTACHMENT FOR AUTOVEHICLES.
APPLICATION FILED JAN. 25, 1913.
1,084,187.
Patented Jan. 13, 1914.
2 SHEETS—SHEET 2.
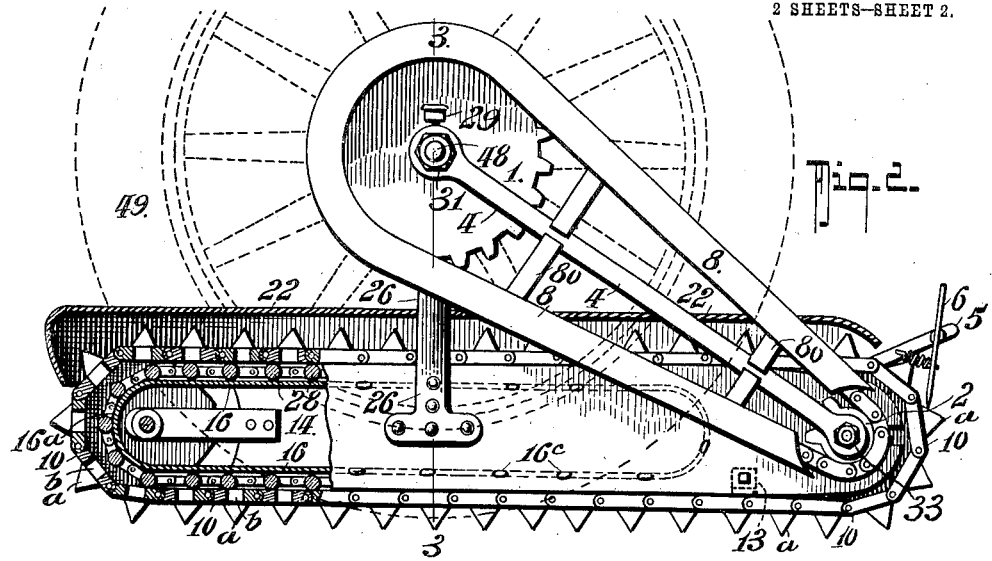
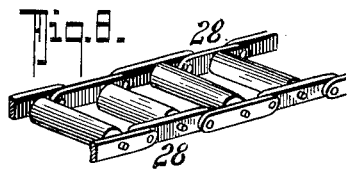
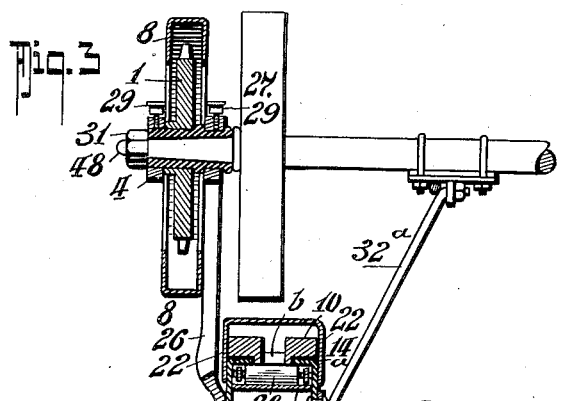
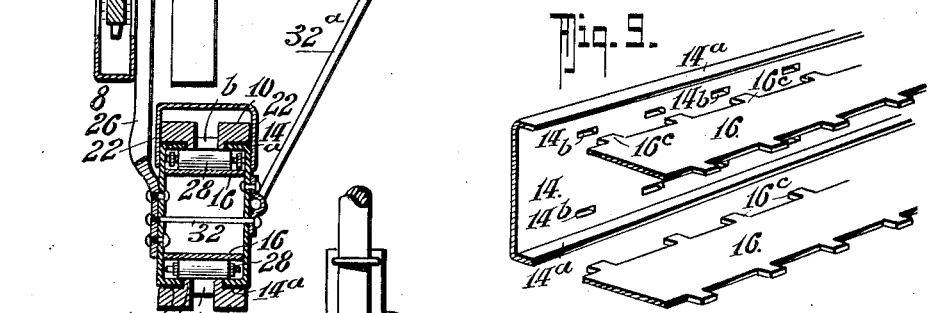
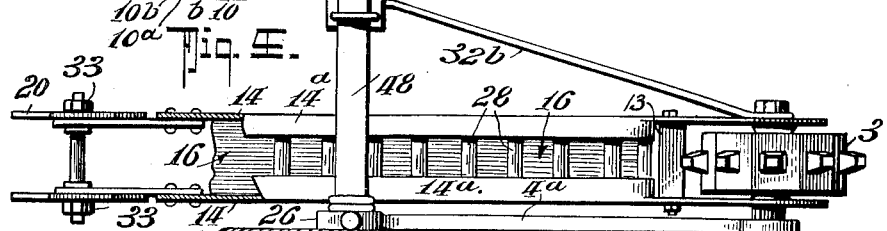

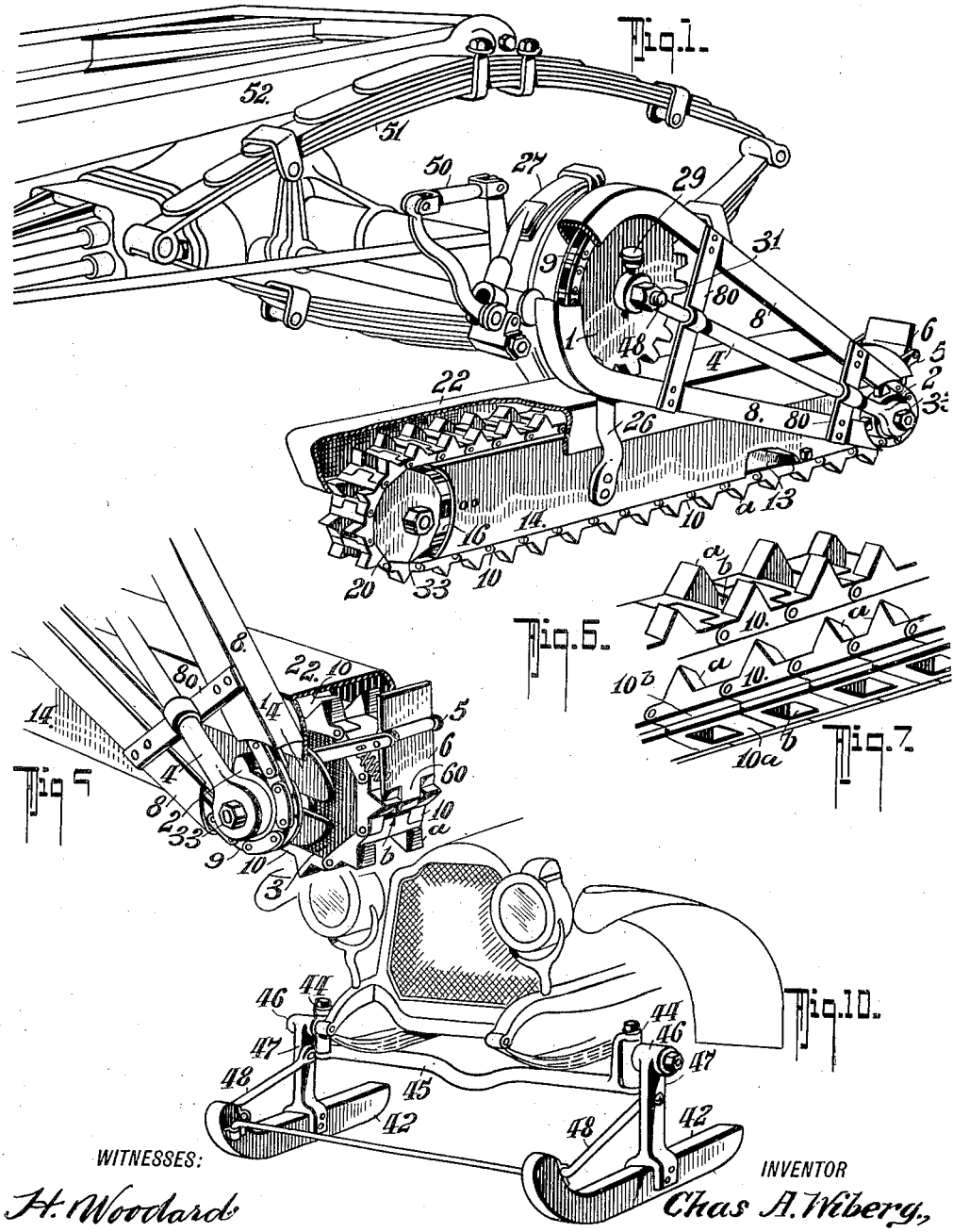

UNITED STATES PATENT OFFICE.

CHARLES A. WIBERG, OF CHISAGO CITY, MINNESOTA.

RUNNER ATTACHMENT FOR AUTOVEHICLES.

1,084,187. Specification of Letters Patent. Patented Jan. 13, 1914.

Application filed January 25, 1913. Serial No. 744,104.

*To all whom it may concern:*

Be it known that I, CHARLES A. WIBERG, residing at Chisago City, in the county of Chisago and State of Minnesota, have invented a new and Improved Runner Attachment for Autovehicles, of which the following is a specification.

My invention relates to improvements in that class of attachments for auto vehicles, that are especially designed to be fitted onto the rear axle as a substitute for the rear wheels and to serve as a driving mechanism for propelling the vehicle forwardly when used in connection with sled runners of any approved type utilized as a substitute for the front wheels.

The main purpose of my invention is to provide a propelling means of the character stated, of a simple and inexpensive construction, that can be readily applied for use on the rear or driving axle of the machine, and in such a manner whereby no material change other than removing the wheels of the machine structure is required and in which the several parts are so combined that the propelling action is uniform and positive.

Another object of my invention is to provide runner attachments for automobiles in which endless spur equipped travelers are included, that serve to pierce and enter the snow and ice under a gripping action sufficient to force the machine forward and in which is also included cleaner devices that clear the spur chains of clogged snow and ice particles.

With other objects in view that will hereinafter appear, my invention is a runner attachment for auto vehicles that embodies the peculiar and novel features of construction and peculiar combination of parts, all of which will be hereinafter fully explained, specifically pointed out in the appended claims and illustrated in the accompanying drawings, in which:

Figure 1 is a perspective view of my invention, the same being shown applied for use, so much of an automobile construction being shown as is necessary to illustrate the practical application of my invention. Fig. 2 is a side elevation of my improved attachments, parts of the endless spur chain and its supports being shown in section. Fig. 3 is a transverse section of the same taken on the line 3—3 on Fig. 2. Fig. 4 is a plan view thereof, parts being in horizontal section. Fig. 5 is a detail perspective view of one of the attachments hereinafter specifically referred to. Fig. 6 is a perspective view that illustrates the top face of a portion of the endless spur chain. Fig. 7 is a similar view of the under face of the said chain portion. Fig. 8 is a detail view of the endless roller chain bearing for the spur chain. Fig. 9 is a detail view of parts of the casing members hereinafter explained. Fig. 10 shows a preferred method of mounting the front axle of the machine or sleigh runners.

In the accompanying drawings, in which like letters and characters designate like parts in all of the figures of the drawings, 49 designates an ordinary rear auto wheel, the said wheel being indicated to show the relative height and length of my attachments that are utilized as a substitute for the said rear wheel when the latter is removed.

In the practical arrangement of my attachment power is transmitted from the rear or driving axle to a small chain wheel 2 located at the rear end of the runner or attachment over which takes the drive chain 9 that passes over the chain wheel 1 on the rear axle 48, and to brace the axle with the wheel 2, a rod 4 is used that joins the support for the wheel 2 with the axle 48, as shown.

8 designates a thin sheet metal casing that protects the driving chain 9.

Coöperative with the driven chain wheel 2 is a polygonal sprocket wheel 3 over which passes the endless mud or driving chain 10 which also passes over similar wheels 20 at the front end of the runner or attachment, which front wheels are rotatable on a shaft fixedly held in bracket arms fastened to and projecting from the sides of the device, as is clearly shown in Figs. 1 and 2 of the drawings. Chain 10 is of a peculiar construction, best shown in Figs. 1, 6 and 7, by reference to which it will be seen the same is composed of a series of links each of which has a set of two projecting spurs *a* arranged one at each of the opposite edges and a central sprocket engaging aperture *b*, for engaging the drive or chain wheel 3 at the rear of the attachment.

By referring now more particularly to Figs. 3 and 4, it will be noticed that the endless spur or propelling chain is held to travel upon an endless chain of bearing rollers 28, having link connections arranged substantially as shown in Fig. 8, and the said endless chain of rollers take around a runway formed of semi-circular ends 16ª—16ª that case in the shafts or axles of the drive wheel 3 and wheels 20. The platforms 16—16, as also the ends 16ᶜ are rigidly sustained in opposite sheet metal casing sides 14—14, the upper and lower ends of which are bent inwardly at right angles to form horizontal keeper flanges 14ª since they project over the opposite ends for the rollers 28 and serve to hold or keep them against the platforms 16—16, while traveling over or under the same. For conveniently joining the platforms 16—16 with the sides 14, the latter have a series of elongated slots 14ᵇ for the passage of the lateral ears 16ᶜ on the said platforms which, after they are inserted through the sides 14 are clenched or upset to become wedged in the openings 14ᵇ. To protect the spur chain and the endless chain of rollers from dirt, etc., the upper part of the said chains are protected by a ⊓ shaped casing 22 the pendent sides of which are riveted or otherwise made fast to side plates 14—14, as is clearly shown in Fig. 3. The sides of the sheet metal casing 22 are spaced apart in such a manner that longitudinal slotways are formed between the inner edges of the horizontal or keeper flanges 14ª, and the bearing faces of the links that constitute the propelling chain each have a centrally projected portion 10ª and grooves 10ᵇ at their opposite edges. By reason of forming the links in the manner stated, provides for holding the endless chain from sagging laterally and also for a solid bearing of the chain upon the casing, since the projected portions 10ª thereof pass into the longitudinal slotways of the casing while the groove portions of the said links are held to ride over the outer surfaces of the horizontal flanges 14ª, as clearly shown in Fig. 3.

5 designates bracket irons rigidly secured to the casing sides 14 at their ends, to project beyond the drive wheel 2, and the said arms carry a pivoted scraper shoe or plate 6 that rides over the spur chain and tends to clear it of snow, ice, etc., and to further clear the chain, especially the inner flat or bearing face thereof, a second scraper or brush device 13 is mounted transversely across the chain, it being supported in the casing sides 14 and held down sufficiently close to clean the inner face of the chain (see Figs. 1 and 4).

When my propelling mechanism is applied for use the front wheels of the motor vehicle are removed and the said front end is mounted upon sled runners which may be of any suitable arrangement,—for example, as shown in Fig. 10, of the drawings, in which—

42 designates the sleds, 45 the front axle and 44 the rocker bearings that have the front wheel spindles, which, in the arrangement shown receive the sleeves 46 on the upper ends of the standards 47 that extend up from the front runners and to which they are braced by the rods 48. While I have not shown it, the front runners, when there is much snow, may be equipped with snow plows or shovels.

26 designates what I term the main brace post, since it is made fast to the propelling attachment and the rear axle in such manner that it sustains the main weight of the machine.

27 designates the brake band mounted on the rear axle and connected with the brake actuating levers 50 operated in any well known manner.

51 designates one of the auto body supporting springs also attached to the rear axle and 52 a part of the vehicle body supported by the spring 51 with the rear axle and braces the said attachment laterally, particularly when turning corners.

The scraper 6 before referred to has central projections 60 that extend down between the two side series of spurs and serve to pick out the ice and snow that gathers between them.

To add strength to the runner or propelling attachment the opposite side plates 14 are braced by cross or stay bars 32 and the casing 8 is likewise braced by the transverse bars 80—80, see Figs. 1 and 2, in which 29 designate oil cups and 31 the removable burs or nut on the rear axle which is removed when the wheel is removed and is replaced to hold the main chain drive gear 1 in place.

In order to prevent the centrifugal force to throw the mechanism out of alinement when the vehicle is turning a curve, brace rods 32ª—32ᵇ are provided, as shown in Figs. 3 and 4, to add stability to the assemblage.

33 designates the nuts that engage the ends of the shafts for the rear and front drive wheels 2 and 20.

From the foregoing description, taken in connection with the accompanying drawings, it is thought the complete construction, arrangement of parts and the advantages of my invention will be readily understood by those skilled in the art to which it appertains.

What I claim is:—

1. In an attachment for automobiles of the character described, an open bottom casing, means for removably suspending the said casing pendently from the drive axle of the vehicle to be driven, an endless spur equipped chain mounted in the casing, a sprocket wheel mounted in each of the opposite ends of the casing over which the said chain passes, power transmission means connecting one of the sprocket wheels with the drive axle, the said spur equipped endless chain consisting of a series of links each having a pair of oppositely disposed spurs and a sprocket receiving aperture between the spurs, the said chain being relatively so mounted within the casing that the spurs project through and over the casing bottom, and provided with lateral portions for riding on the upper and under faces of the said casing.

2. In an attachment of the character described; a casing, a sprocket wheel in each end thereof, power transmission means for connecting one of the said sprocket wheels with the drive axle of the vehicle, an endless chain having ice and snow penetrating spurs, the said chain being mounted on and driven by the sprocket wheels in the casing, and a chain of endless bearing rollers continuously engaging the upper and lower sections of the endless chain and over which the said chain passes.

3. In an attachment of the character described; a casing, a sprocket wheel in each end thereof, power transmission means for connecting one of the said sprocket wheels with the drive axle of the vehicle, an endless chain having ice and snow penetrating spurs, the said chain being mounted on and driven by the sprocket wheels in the casing, a chain of endless bearing rollers over which the spur gear passes and upper and lower bearing platforms within the casing on which the endless chain of roller bearings is mounted, the said platforms extending entirely across the casing and connected thereto to thereby brace the said casing.

4. In an attachment of the character described; a casing, a sprocket wheel in each end thereof, power transmission means for connecting one of the said sprocket wheels with the drive axle of the vehicle, an endless chain having ice and snow penetrating spurs, the said chain being mounted on and driven by the sprocket wheels in the casing, a chain of endless bearing rollers over which the spur gear passes and upper and lower bearing platforms within the casing on which the endless chain of roller bearings is mounted, and means for holding the said roller bearings against the said platforms.

5. In an attachment of the character described, a casing, a sprocket wheel mounted in each end of the casing, means for removably supporting the attachment from the drive axle, the latter having a driving pinion, a transmission chain that connects the axle pinion and one of the casing sprockets, an endless chain having snow penetrating spurs that take around and are driven by the sprocket wheels, an endless chain of bearing rollers on which the spur chain travels, an endless division plate within the casing that connects the opposite sides of the said casing and forms upper and lower platforms on which the endless chain of bearing rollers is mounted, the sides of the casing having inturned flanges that fit over and keep the bearing surfaces against the upper and lower platforms.

CHARLES A. WIBERG.

Witnesses:
CHARLES A. WALLMARK,
JENNIE WALLMARK.